(12) United States Patent
Fujii et al.

(10) Patent No.: US 10,072,542 B2
(45) Date of Patent: Sep. 11, 2018

(54) ABNORMALITY DIAGNOSIS DEVICE

(71) Applicant: DENSO CORPORATION, Kariya, Aichi-pref. (JP)

(72) Inventors: Hiroaki Fujii, Kariya (JP); Shingo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 15/519,943

(22) PCT Filed: Jan. 7, 2016

(86) PCT No.: PCT/JP2016/000057
§ 371 (c)(1),
(2) Date: Apr. 18, 2017

(87) PCT Pub. No.: WO2016/114111
PCT Pub. Date: Jul. 21, 2016

(65) Prior Publication Data
US 2017/0328248 A1 Nov. 16, 2017

(30) Foreign Application Priority Data
Jan. 13, 2015 (JP) .................................... 2015-4189

(51) Int. Cl.
*F01N 3/00* (2006.01)
*F01N 3/022* (2006.01)
(Continued)

(52) U.S. Cl.
CPC ............ *F01N 3/022* (2013.01); *F01N 3/023* (2013.01); *F01N 3/035* (2013.01); *F01N 3/204* (2013.01); *F02M 35/02* (2013.01)

(58) Field of Classification Search
USPC ................... 60/276, 277, 286, 295, 297, 311
See application file for complete search history.

(56) References Cited

U.S. PATENT DOCUMENTS

| 7,162,867 B2 * | 1/2007 | Saito | F01N 3/023 60/295 |
| 8,413,429 B2 * | 4/2013 | Gioannini | F01N 3/023 60/274 |

(Continued)

FOREIGN PATENT DOCUMENTS

| JP | 2003-155920 | 5/2003 |
| JP | 2007-315275 | 12/2007 |
| WO | WO 2012/046484 | 4/2012 |

OTHER PUBLICATIONS

International Search Report for PCT/JP2016/000057, dated Mar. 22, 2016, 2 pages.

(Continued)

*Primary Examiner* — Binh Q Tran
(74) *Attorney, Agent, or Firm* — Nixon & Vanderhye PC

(57) ABSTRACT

An abnormality diagnosis device includes a partially-plugged filter, a pressure difference sensor, a PM sensor, a first estimation portion estimating a diagnosis amount of PM from the partially-plugged filter, according to a running condition of the internal combustion engine, a second estimation portion estimating the diagnosis amount of PM according to an output of the pressure difference sensor, a third estimation portion estimating the diagnosis amount of PM according to an output of the PM sensor, and an abnormality diagnosis portion distinctly determining an abnormality of the internal combustion engine, an abnormality of the partially-plugged filter, and an abnormality of the PM sensor by comparing the diagnosis amount of PM estimated by the first estimation portion, the diagnosis amount of PM estimated by the second estimation portion, and the diagnosis amount of PM estimated by the third estimation portion.

6 Claims, 11 Drawing Sheets

(51) Int. Cl.
*F01N 3/035* (2006.01)
*F01N 3/023* (2006.01)
F02M 35/02 (2006.01)
F01N 3/20 (2006.01)

(56) References Cited

U.S. PATENT DOCUMENTS

| | | | | |
|---|---|---|---|---|
| 8,561,388 | B2* | 10/2013 | Yahata | F01N 11/007 |
| | | | | 60/274 |
| 9,464,555 | B2* | 10/2016 | Ante | F01N 9/002 |
| 2005/0217256 | A1* | 10/2005 | Okugawa | F01N 9/002 |
| | | | | 60/295 |

OTHER PUBLICATIONS

Written Opinion of the ISA for PCT/JP2016/000057, dated Mar. 22, 2016, 3 pages.

\* cited by examiner

ABNORMALITY OF ENGINE

ABNORMALITY OF FILTER

RECYCLE ABNORMALITY OF FILTER

ABNORMALITY OF PM SENSOR

ABNORMALITY DIAGNOSIS DEVICE

CROSS REFERENCE TO RELATED APPLICATION

This application is the U.S. national phase of International Application No. PCT/JP2016/000057 filed Jan. 7, 2016 which designated the U.S. and claims priority to Japanese Patent Application No. 2015-4189 on Jan. 13, 2015, the entire contents of each of which incorporated herein by reference.

TECHNICAL FIELD

The present disclosure relates to an abnormality diagnosis device in a system provided with a filter which captures particulate matter in an exhaust gas from an internal combustion engine.

BACKGROUND ART

A demand for an in-cylinder injection gasoline engine is expected to increase as fuel efficiency requirements are tightened for an internal combustion engine installed to a vehicle. However, an in-cylinder injection gasoline engine may possibly have a larger amount of PM (Particulate Matter) emission than an intake-port injection gasoline engine. In order to eliminate such a possibility, a filter capturing PM discharged from the engine is disposed in an exhaust passage of the engine.

A technique to diagnose an abnormality of the PM capturing filter is disclosed in, for example, Patent Literature 1 (JP2007-315275A). According to the disclosed technique, a PM sensor detecting an amount of PM in an exhaust gas is provided downstream of the PM capturing filter and presence or absence of a failure of the filter is determined depending on whether an amount of PM detected by the PM sensor exceeds a determination value under a condition that capturing efficiency of the filter is at or above a predetermined value.

A type of the PM capturing filter in the related art has a structure in which some of multiple cells provided to the filter are closed on an inlet side and the other cells (that is, inlet-opened cells) are closed on an outlet side.

PRIOR ART LITERATURES

Patent Literature

Patent Literature 1: JP2007-315275A

SUMMARY OF INVENTION

The filter in the related art is configured in such a manner that once an exhaust gas flows into the inlet-opened cells, substantially the entire exhaust gas flows out from the outlet-opened cells by passing across dividing walls (partition walls) having a porous structure and defining the cells and PM in the exhaust gas is captured while the exhaust gas passes across the dividing walls. The filter in the related art, however, has a deficit that a pressure loss of exhaust increases.

In order to reduce a pressure loss of exhaust caused by the filter, the inventors have been studying a system provided with a partially-plugged filter having a structure in which some of multiple cells are closed on the inlet side and at least one of the other cells is opened on the outlet side (or a structure in which some cells are closed on the outlet side and at least one of the other cells is opened on the inlet side).

As is shown in FIG. 8, a PM capturing rate of the filter in the related art is maintained at substantially 100% after an amount of deposited PM has increased. On the contrary, a PM capturing rate of the partially-plugged filter is maintained at a capturing rate lower than the capturing rate of the filter in the related art (at a capturing rate lower than 100%) even after an amount of deposited PM has increased.

Hence, in a system provided with the partially-plugged filter, as is shown in FIG. 9, an amount of sensor-detected PM (an amount of PM detected by the PM sensor) increases in a case where a PM capturing rate decreases due to an abnormality of the partially-plugged filter. In addition, as is shown in FIG. 10, an amount of sensor-detected PM increases also in a case where an amount of PM emitted from the engine increases due to an abnormality of the engine. Further, an amount of sensor-detected PM may possibly increase due to an abnormality of the PM sensor itself. Hence, by merely comparing an amount of PM detected by the PM sensor with the determination value as the technique disclosed in Patent Literature 1, an abnormality of the engine, an abnormality of the partially-plugged filter, and an abnormality of the PM sensor cannot be determined distinctly. Hence, the inventors discovered a problem that the system fails to pinpoint a location of abnormality when an abnormality occurs in any one of the engine, the partially-plugged filter, and the PM sensor.

An object of the present disclosure is to provide an abnormality diagnosis device capable of pinpointing a location of abnormality when an abnormality occurs in any one of an internal combustion engine, a partially-plugged filter, and a PM sensor.

According to an aspect of the present disclosure, the abnormality diagnosis device includes a partially-plugged filter capturing particulate matter in an exhaust gas from an internal combustion engine, the partially-plugged filter having a plurality of cells, and the partially-plugged filter having a structure in which some of the cells are closed on an inlet side and at least one of the other cells is opened on an outlet side or a structure in which some of the cells are closed on the outlet side and at least one of the other cells is opened on the inlet side, a pressure difference sensor detecting a difference between an exhaust pressure on an upstream side of the partially-plugged filter and an exhaust pressure on a downstream side of the partially-plugged filter, a PM sensor detecting an amount of PM in an exhaust gas which has passed through the partially-plugged filter, a first estimation portion estimating a diagnosis amount of PM, which is one of an amount of PM flowing into the partially-plugged filter, an amount of PM captured in the partially-plugged filter, and an amount of PM flowing out from the partially-plugged filter, according to a running condition of the internal combustion engine, a second estimation portion estimating the diagnosis amount of PM according to an output of the pressure difference sensor, a third estimation portion estimating the diagnosis amount of PM according to an output of the PM sensor, and an abnormality diagnosis portion distinctly determining an abnormality of the internal combustion engine, an abnormality of the partially-plugged filter, and an abnormality of the PM sensor by comparing a first PM amount that is the diagnosis amount of PM estimated by the first estimation portion, a second PM amount that is the diagnosis amount of PM estimated by the second estimation portion, and a third PM amount that is the diagnosis amount of PM estimated by the third estimation portion.

When all of the internal combustion engine, the partially-plugged filter, and the PM sensor are normal, the first PM amount, the second PM amount, and the third PM amount are expected to substantially coincide with one another. However, in the event of an abnormality in any one of the internal combustion engine, the partially-plugged filter, and the PM sensor, an estimated amount of PM in a location of abnormality becomes different from the other estimated amounts of PM. Hence, by comparing the first PM amount, the second PM amount, and the third PM amount, an abnormality of the internal combustion engine, an abnormality of the partially-plugged filter, and an abnormality of the PM sensor can be determined distinctly. Consequently, a location of abnormality can be pinpointed when an abnormality occurs in any one of the internal combustion engine, the partially-plugged filter, and the PM sensor.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENT

Hereinafter, one concrete embodiment to carry out present disclosure will be described.

Figure 1:
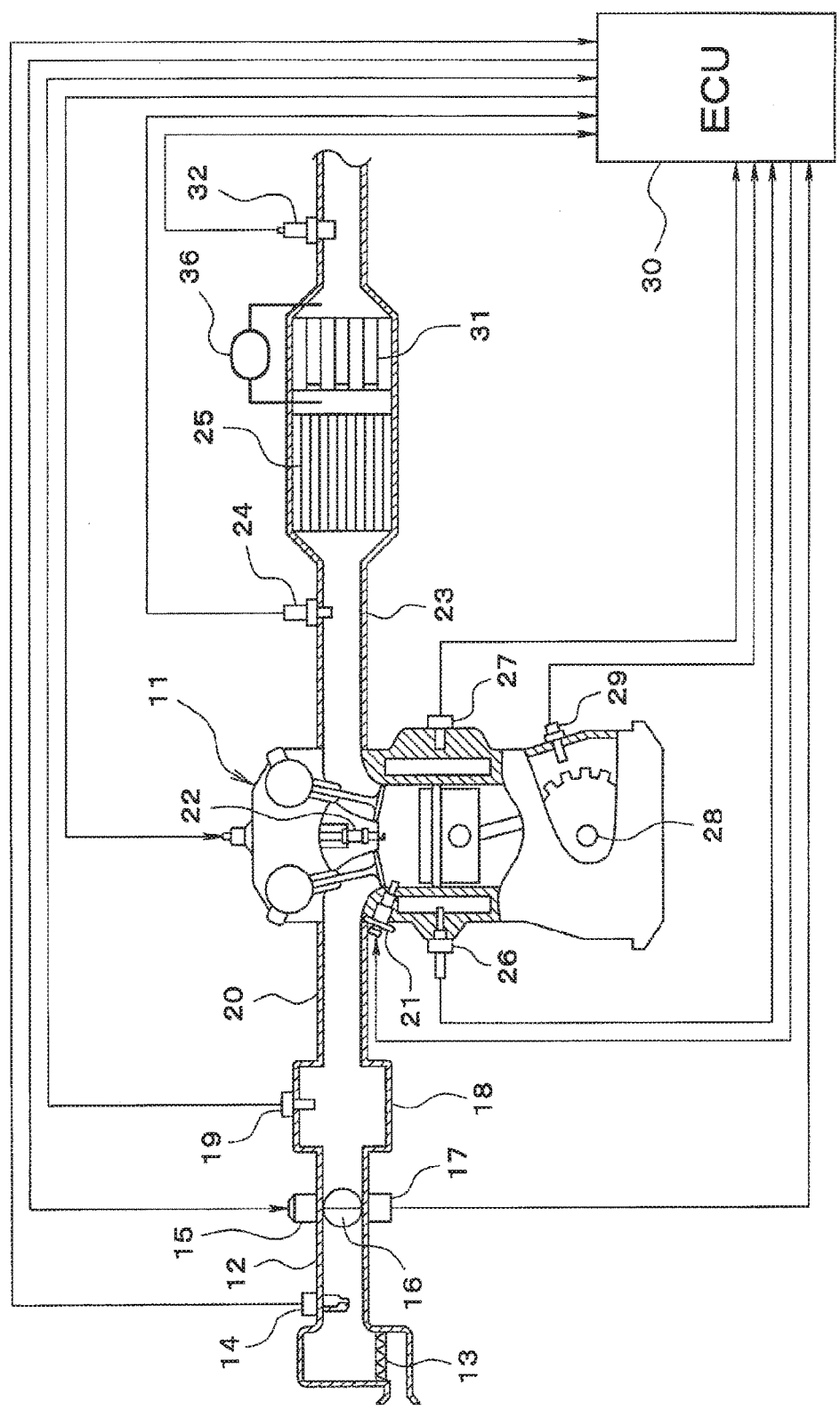
FIG. 1 is a view showing a schematic configuration of an engine control system according to one embodiment of the present disclosure.

A schematic configuration of an engine control system will be described according to FIG. 1.

An engine 11 is an in-cylinder injection internal combustion engine, and more specifically, an in-cylinder injection gasoline engine configured to directly inject gasoline as fuel into cylinders. An air cleaner 13 is provided to an uppermost stream portion of an intake pipe 12 of the engine 11. An airflow meter 14 detecting an amount of intake air is provided downstream of the air cleaner 13. A throttle valve 16 driven by a motor 15 to open at a regulated opening degree and a throttle opening degree sensor 17 detecting an opening degree of the throttle valve 16 (degree of throttle opening) are provided downstream of the airflow meter 14.

A surge tank 18 is provided downstream of the throttle valve 16 and the surge tank 18 is provided with an intake pipe pressure sensor 19 detecting an intake pipe pressure. The surge tank 18 is also provided with an intake manifold 20 introducing air into respective cylinders of the engine 11. A fuel injection valve 21 is attached to each cylinder of the engine 11 and directly injects fuel (gasoline) into the cylinder. A sparking plug 22 is attached to a cylinder head of the engine 11 for each cylinder. An air-fuel mixture in each cylinder is ignited by a spark discharge of the sparking plug 22 attached to the cylinder.

Meanwhile, an exhaust gas sensor 24 (an air-fuel ratio sensor, an oxygen sensor, or the like) detecting an air-fuel ratio of an exhaust gas or whether an air-fuel ratio is lean or rich is provided to an exhaust pipe 23 of the engine 11. A catalyst 25, such as a three-way catalyst, cleaning CO, HC, $NO_x$, and so on in an exhaust gas is provided downstream of the exhaust gas sensor 24.

A partially-plugged filter 31 capturing PM (Particulate Matter) in an exhaust gas from the engine 11 is provided downstream of the catalyst 25 in the exhaust pipe 23 of the engine 11. The catalyst 25 and the partially-plugged filter 31 may be stored in a single case or stored in separate cases. Further, a PM sensor 32 detecting an amount of PM in an exhaust gas which has passed through the partially-plugged filter 31 is provided downstream of the partially-plugged filter 31.

A pressure difference sensor 36 detecting a difference (front-back pressure difference) between an exhaust pressure on an upstream side and an exhaust pressure on a downstream side of the partially-plugged filter 31 is also provided. Alternatively, pressure sensors detecting an exhaust pressure may be provided both upstream and downstream of the partially-plugged filter 31 to calculate a difference (front-back pressure difference) between an exhaust pressure on the upstream side detected by the pressure sensor provided on the upstream side and an exhaust pressure on the downstream side detected by the pressure sensor provided on the downstream side. In such a case, the pressure sensors provided on the upstream side and the downstream side function as a pressure difference sensor.

A coolant temperature sensor 26 detecting a coolant temperature and a knocking sensor 27 detecting knocking are attached to a cylinder block of the engine 11. A crank angle sensor 29 outputting a pulse signal each time a crank shaft 28 rotates by a predetermined crank angle is attached to an outer periphery side of the crank shaft 28. A crank angle and an engine speed are detected according to an output signal of the crank angle sensor 29.

Outputs of the various sensors are inputted into an electronic control unit (ECU) 30. The ECU 30 is chiefly formed of a micro-computer and controls an injection amount of fuel, ignition timing, a degree of throttle opening (an amount of intake air), and so on according to an engine running condition by executing various engine control programs preliminarily stored in an internal ROM (memory medium). In the present embodiment, the abnormality diagnosis device has the partially-plugged filter 31, the pressure difference sensor 36, the PM sensor 32, and the ECU 30.

Figure 2:
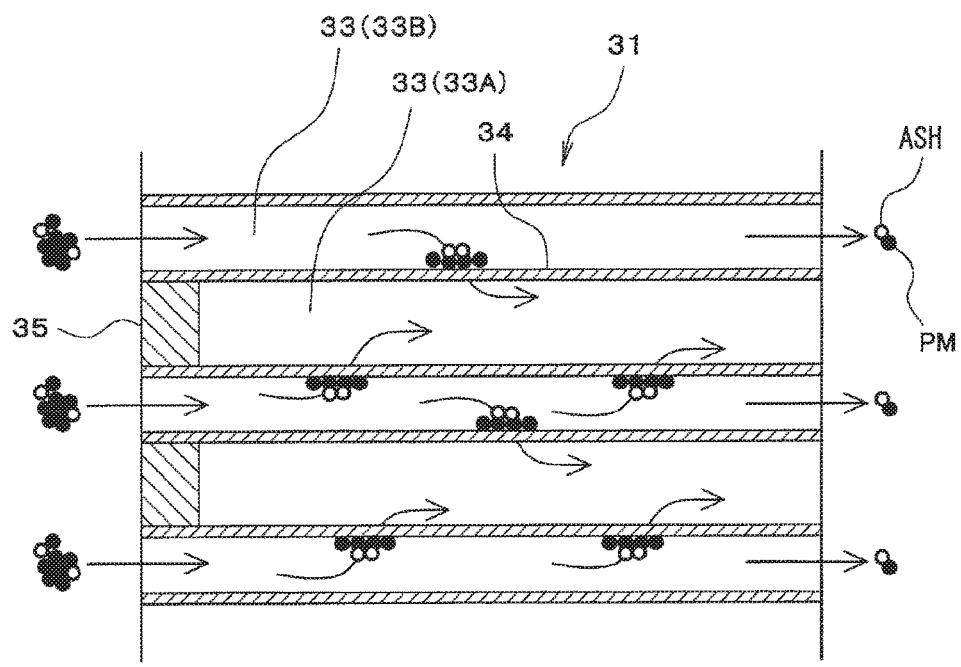
FIG. 2 is a sectional view of a partially-plugged filter taken along a flow direction of an exhaust gas.
Figure 3:
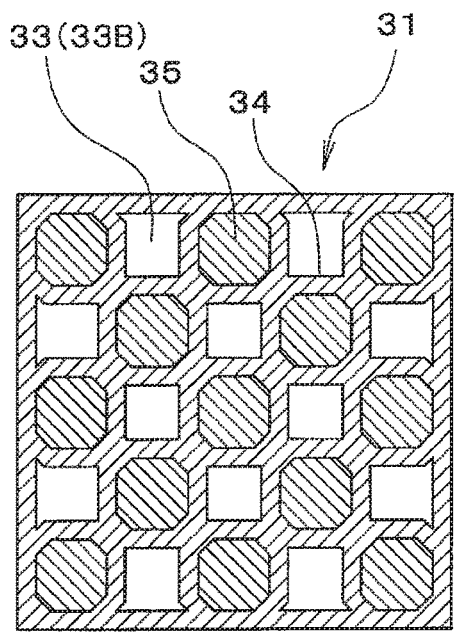
FIG. 3 is a sectional view of the partially-plugged filter on an inlet side taken along a direction orthogonal to the flow direction of an exhaust gas.
Figure 4:
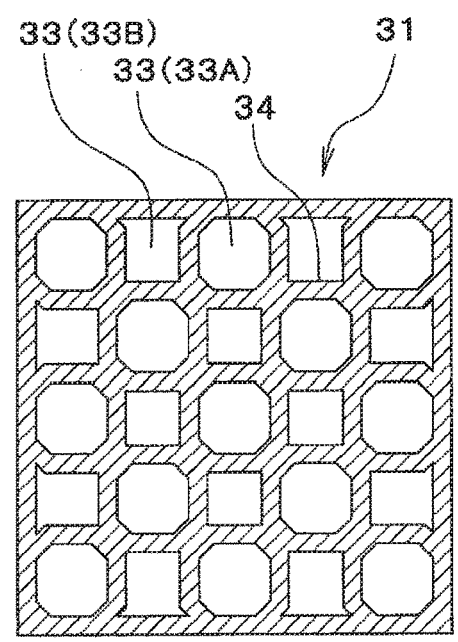
FIG. 4 is a sectional view of the partially-plugged filter on an outlet side taken along a direction orthogonal to the flow direction of an exhaust gas.

As are shown in FIG. 2 through FIG. 4, the partially-plugged filter 31 includes multiple cells 33 extending in a flow direction of an exhaust gas (a direction heading from an inlet side to an outlet side) and defined by dividing walls (partition walls) 34 having a porous structure. Some of the cells 33 are closed by a sealing member 35 at ends on an inlet side and all of the cells 33 are opened on an outlet side. In the present embodiment, let a cell closed on the inlet side and opened on the outlet side be an inlet-closed cell 33A and a cell opened on both of the inlet side and the outlet side be a double-side open cell 33B, then the cells 33A and 33B are situated next to each other alternately.

In the partially-plugged filter 31, when an exhaust gas flows into the double-side open cells 33B from the inlet side of the double-side open cells 33B, an internal pressure of the double-side open cells 33B rises. Accordingly, an internal pressure of the inlet-closed cells 33A becomes low relative to an internal pressure of the double-side open cells 33B. Hence, a part of the exhaust gas in the double-side open cells 33B flows into the inlet-closed cells 33A by passing across the dividing walls 34 having a porous structure and flows outside of the inlet-closed cells 33A from the outlet side of the inlet-closed cells 33A. While the exhaust gas flows in and out in the manner as above, PM (for example, soot particles having a particle size of 20 to 100 nm) in the exhaust gas adheres to pore inner portions (inner wall surfaces of pores) and outer layers of wall surfaces of the dividing walls 34 and is thus captured. Ash, which is a non-combustible substance (for example, ash content generated from oil in the engine 11) in the exhaust gas, adheres to the pore inner portions and the outer layers of the wall surfaces of the dividing walls 34 and is thus also captured.

Figure 5:
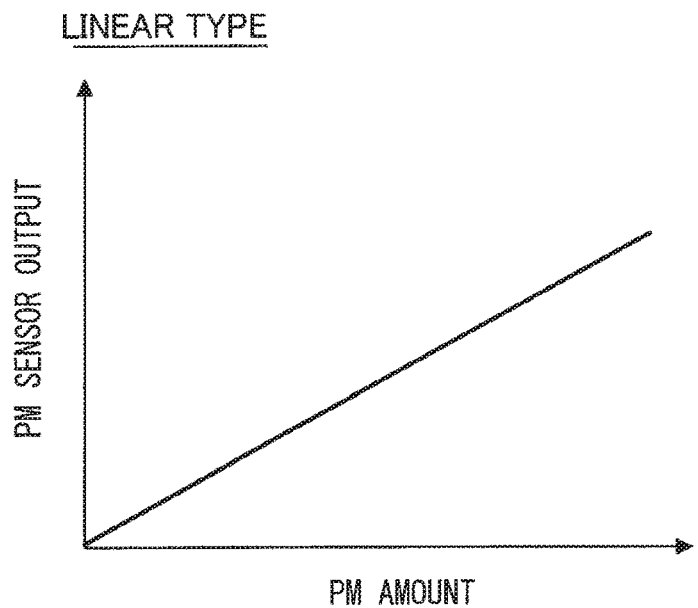
FIG. 5 is an output characteristic view of a linear PM sensor.
Figure 6:
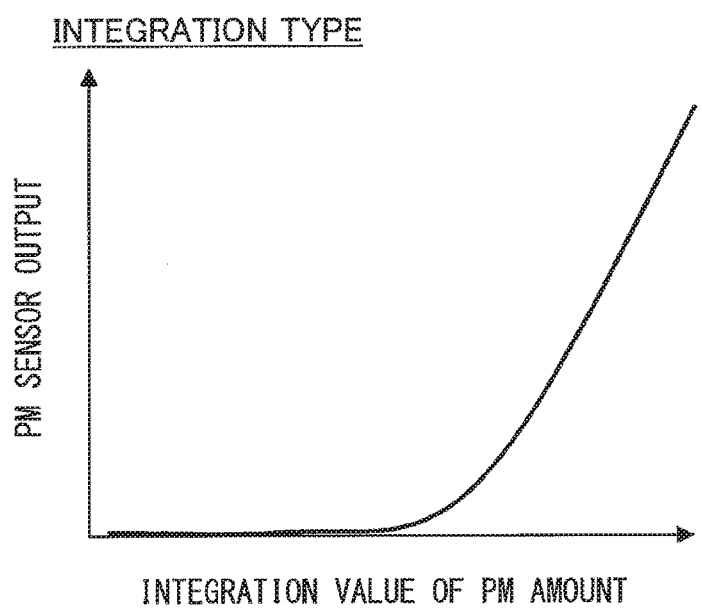
FIG. 6 is an output characteristic view of an integration PM sensor.

It is preferable to use a linear PM sensor having a linear output characteristic as the PM sensor 32. However, an integration PM sensor having an integration output characteristic may be used as well. As is shown in FIG. 5, a sensor output of the linear PM sensor varies linearly in response to an amount of PM in an exhaust gas. On the other hand, as is shown in FIG. 6, a sensor output of the integration PM sensor varies in response to an integration value of an amount of PM after an integration value of an amount of PM adhered to the PM sensor reaches or exceeds a constant value.

Figure 7:
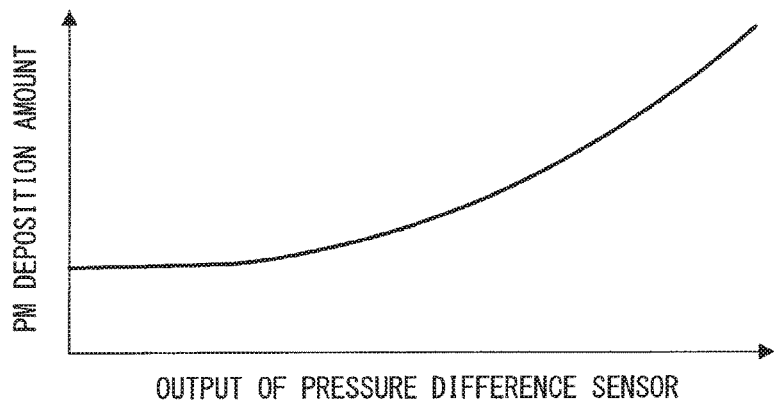
FIG. 7 is a view showing a relation of an output of a pressure difference sensor and an amount of deposited PM.

As is shown in FIG. 7, an output of the pressure difference sensor 36 varies when a front-back pressure difference of the partially-plugged filter 31 changes in response to an amount of deposited PM of the partially-plugged sensor 31 (an amount of PM deposited on the partially-plugged sensor 31). Hence, an amount of deposited PM of the partially-plugged filter 31 can be found from an output of the pressure difference sensor 36.

In the system provided with the partially-plugged filter 31 that captures the PM, a pressure loss of exhaust increases when an amount of deposited PM of the partially-plugged filter 31 becomes too large. In order to eliminate such an inconvenience, the ECU 30 recycles the partially-plugged filter 31 by performing a recycle control by which PM captured in the partially-plugged filter 31 is removed by burning the captured PM (that is, reduce an amount of deposited PM of the partially-plugged filter 31). The recycle control includes, for example, a fuel cut control performed when a predetermined fuel cut execution condition is satisfied (for example, during deceleration). When an amount of deposited PM of the partially-plugged filter 31 exceeds a predetermined upper-limit value, the ECU 30 performs a control to make an air-fuel ratio lean or a control to raise an exhaust temperature as the recycle control.

Figure 8:
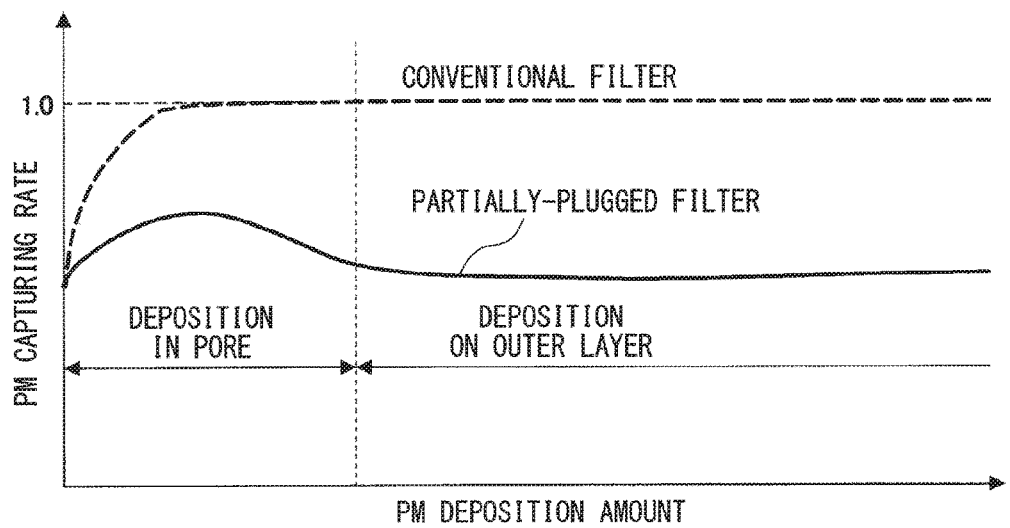
FIG. 8 is a view showing a relation of an amount of deposited PM and a PM capturing rate.

As is shown in FIG. 8, a PM capturing rate of the filter in the related art is maintained substantially at 100% after an amount of deposited PM has increased. On the contrary, a PM capturing rate of the partially-plugged filter 31 is maintained at a capturing rate lower than the capturing rate of the filter in the related art (at a capturing rate lower than 100%) even after an amount of deposited PM has increased.

Figure 9:
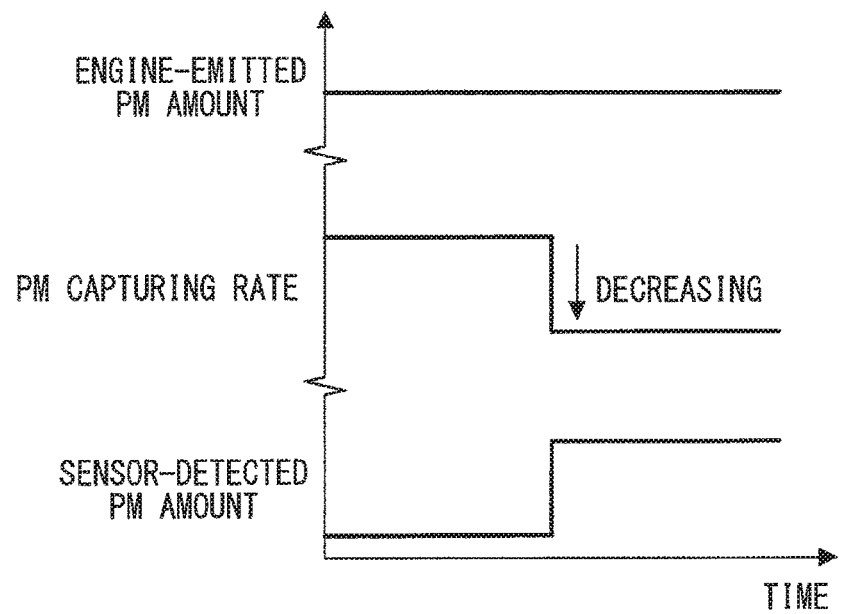
FIG. 9 is a time chart showing a behavior of an amount of sensor-detected PM when a PM capturing rate decreases due to an abnormality of the filter.
Figure 10:
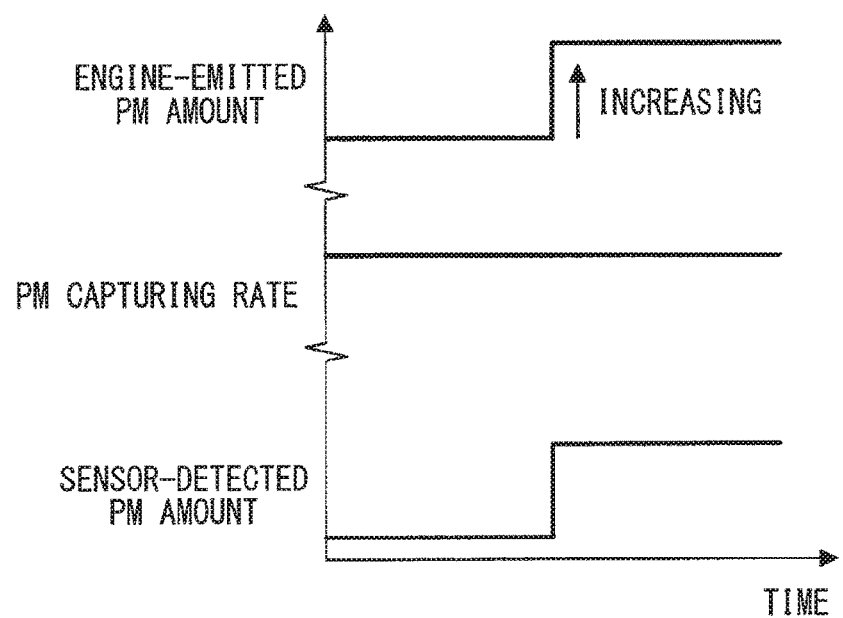
FIG. 10 is a time chart showing a behavior of an amount of sensor-detected PM when an amount of engine-emitted PM increases due to an abnormality of an engine.

Hence, in a system provided with the partially-plugged filter 31, as is shown in FIG. 9, an amount of sensor-detected PM (an amount of PM detected by the PM sensor 32) increases in a case where a PM capturing rate decreases due to an abnormality of the partially-plugged filter 31. In addition, as is shown in FIG. 10, an amount of sensor-detected PM increases also in a case where an amount of PM emitted from the engine 11 increases due to an abnormality of the engine 11, Further, an amount of sensor-detected PM may possibly increase due to an abnormality of the PM sensor 32 itself. Hence, by merely comparing an amount of PM detected by the PM sensor 32 with a determination value, an abnormality of the engine 11, an abnormality of the partially-plugged filter 31, and an abnormality of the PM sensor 32 cannot be determined distinctly. Hence, the system fails to pinpoint a location of abnormality when an abnormality occurs in any one of the engine 11, the partially-plugged filter 31, and the PM sensor 32.

Figure 16:
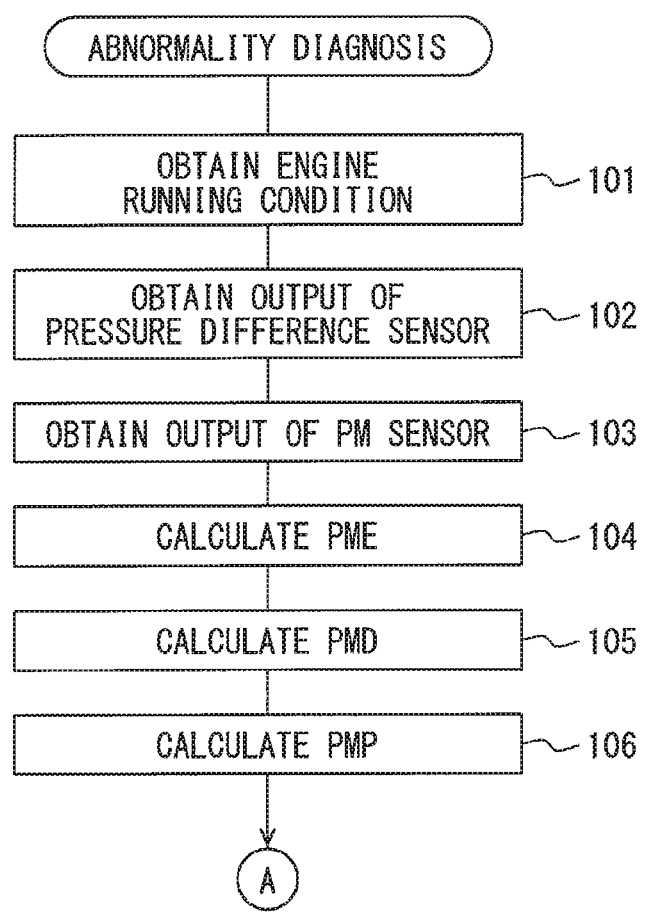
FIG. 16 is a first half of a flowchart depicting a flow of processes in an abnormality diagnosis routine.
Figure 17:
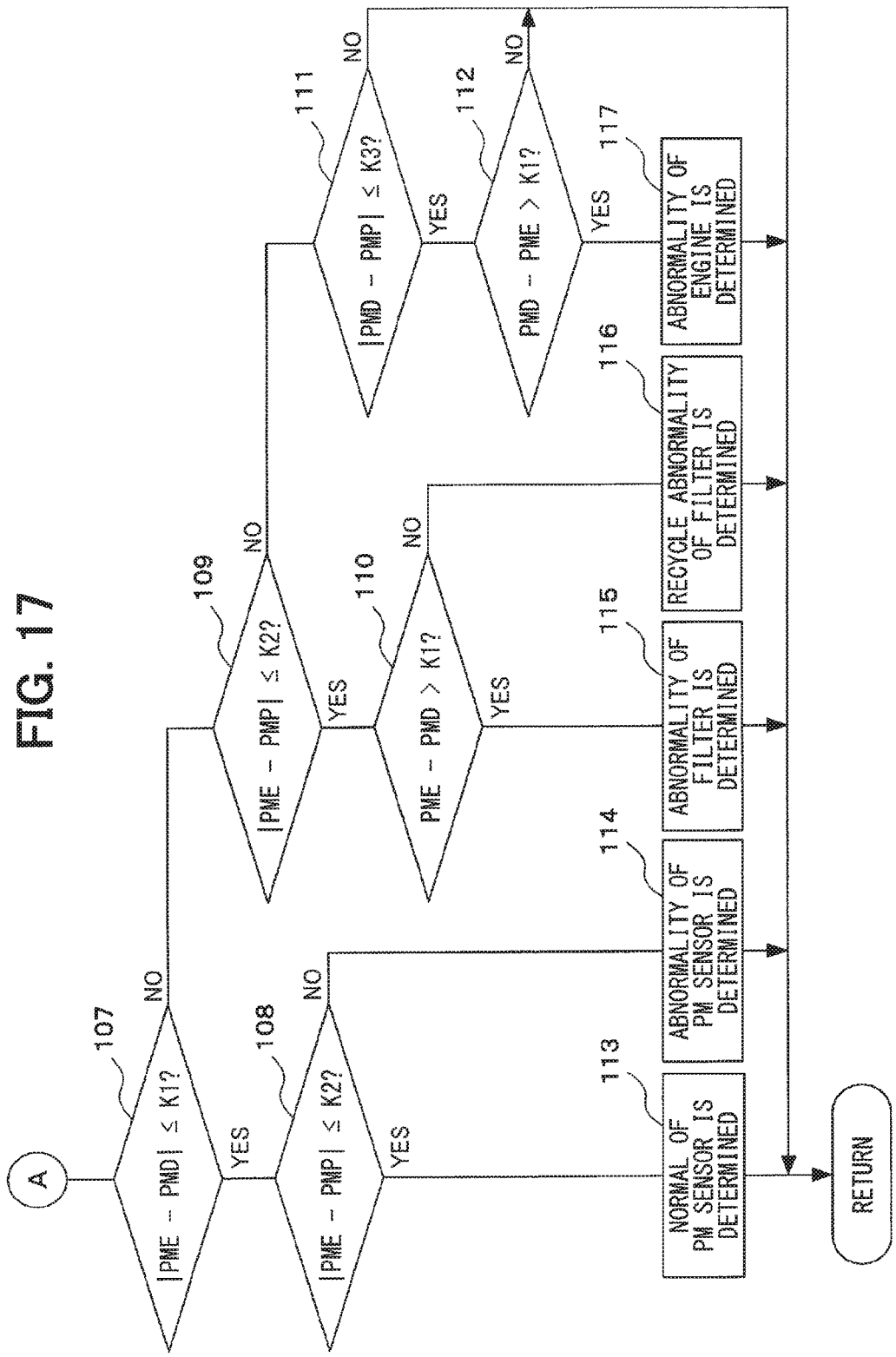
FIG. 17 is a second half of the flowchart depicting the flow of processes in the abnormality diagnosis routine.

In order to eliminate such an inconvenience, an abnormality diagnosis is performed in the present embodiment by executing an abnormality diagnosis routine of FIG. 16 and FIG. 17 by the ECU 30.

Firstly, any one of an amount of filter inflow PM (an amount of PM flowing into the partially-plugged filter 31), an amount of filter-captured PM (an amount of PM captured in the partially-plugged filter 31), and an amount of filter outflow PM (an amount of PM flowing out from the partially-plugged filter 31) is selected as a diagnosis amount of PM, and the diagnosis amount of PM is estimated by three estimation methods. In the present embodiment, an amount of filter inflow PM is the diagnosis amount of PM and estimated by first to third estimation methods.

The first estimation method estimates an amount of filter inflow PM according to a running condition of the engine 11. An amount of filter inflow PM estimated according to the running condition of the engine 11 by the first estimation method is referred to as a first PM amount. The first PM amount is an estimated amount of PM according to an engine running condition.

The second estimation method estimates an amount of filter inflow PM according to an output of the pressure difference sensor 36. An amount of filter inflow PM estimated according to an output of the pressure difference sensor 36 by the second estimation method is referred to as a second PM amount. The second PM amount is an estimated amount of PM according to an output of a pressure difference sensor.

The third estimation method estimates an amount of filter inflow PM according to an output of the PM sensor 32. An amount of filter inflow PM estimated according to an output of the PM sensor 32 by the third estimation method is referred to as a third PM amount. The third PM amount is an estimated amount of PM according to an output of a PM sensor.

The first PM amount, the second PM amount, and the third PM amount are compared with one another to distinctly determine an abnormality of the engine 11, an abnormality of the partially-plugged filter 31, and an abnormality of the PM sensor 32.

When all of the engine 11, the partially-plugged filter 31, and the PM sensor 32 are normal, the first PM amount, the second PM amount, and the third PM amount are expected to substantially coincide with one another. However, in the event of an abnormality in any one of the engine 11, the partially-plugged filter 31, and the PM sensor 32, an estimated amount of PM in a location of the abnormality differs from the other two estimated amounts of PM. Hence, by comparing the first PM amount, the second PM amount, and the third PM amount, an abnormality of the engine 11, an abnormality of the partially-plugged filter 31, and an abnormality of the PM sensor 32 can be determined distinctly.

Figure 11:
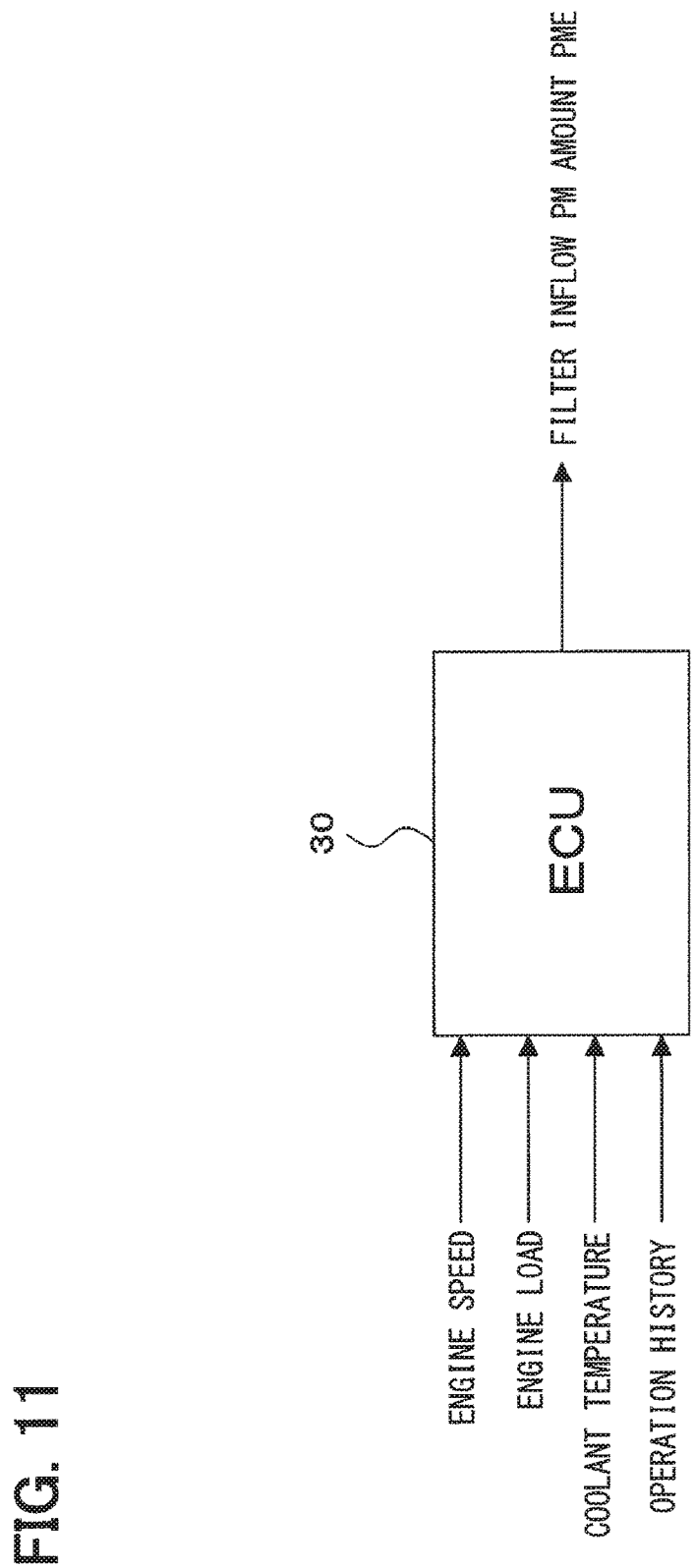
FIG. 11 is a view used to describe an estimation method of a first PM amount.

More specifically, in the first estimation method, as is shown in FIG. 11, an amount of engine-emitted PM (for example, an amount of PM emitted from the engine 11 per predetermined time) is calculated according to an engine speed, an engine load (for example, an intake pipe pressure or an amount of intake air), a coolant temperature, an operation history, and so on with reference to a map or in accordance with a mathematical formula. A map or a mathematical formula of an amount of engine-emitted PM is prepared in advance according to test data, design data, and so on and preliminarily stored in the ROM of the ECU 30. An amount of engine-emitted PM thus calculated is given as a filter inflow PM amount PME.

a filter inflow PM amount PME=amount of engine-emitted PM

A filter inflow PM amount PME estimated (calculated) according to a running condition of the engine 11 in the manner as above is given as a first PM amount PME.

In the second estimation method, an amount of captured PM of the partially-plugged filter 31 (for example, an amount of PM captured in the partially-plugged filter 31 per predetermined time) is calculated first according to an output of the pressure difference sensor 36. Herein, for example, an amount of deposited PM corresponding to an output of the pressure difference sensor 36 is calculated with reference to a map or in accordance with a mathematical formula and a difference between a present value and a last value of an amount of deposited PM (an amount of deposited PM per predetermined time) is calculated as an amount of captured PM. Also, a PM capturing rate is calculated according to a present amount of deposited PM with reference to a map or in accordance with a mathematical formula. Maps or mathematical formulae of an amount of deposited PM and a PM capturing rate are prepared in advance according to test data, design data, and so on and preliminarily stored in the ROM of the ECU 30. Subsequently, a filter inflow PM amount PMD is calculated in accordance with an equation below by using an amount of captured PM and a PM capturing rate.

a filter inflow PM amount PMD=an amount of captured PM/PM capturing rate

A filter inflow PM amount PMD estimated (calculated) according to an output of the pressure difference sensor 36 in the manner as above is given as a second PM amount PMD.

In the third estimation method, an amount of sensor-detected PM (for example, an amount of PM which has passed through the partially-plugged filter 31 per predetermined time) is calculated first according to an output of the PM sensor 32. Subsequently, a filter inflow PM amount PMP is calculated in accordance with an equation below by using an amount of sensor-detected PM and a PM capturing rate.

a filter inflow PM amount PMP=an amount of sensor-detected PM/(1−PM capturing rate)

A filter inflow PM amount PMP estimated (calculated) according to an output of the PM sensor 32 in the manner as above is given as a third PM amount PMP.

Figure 12:
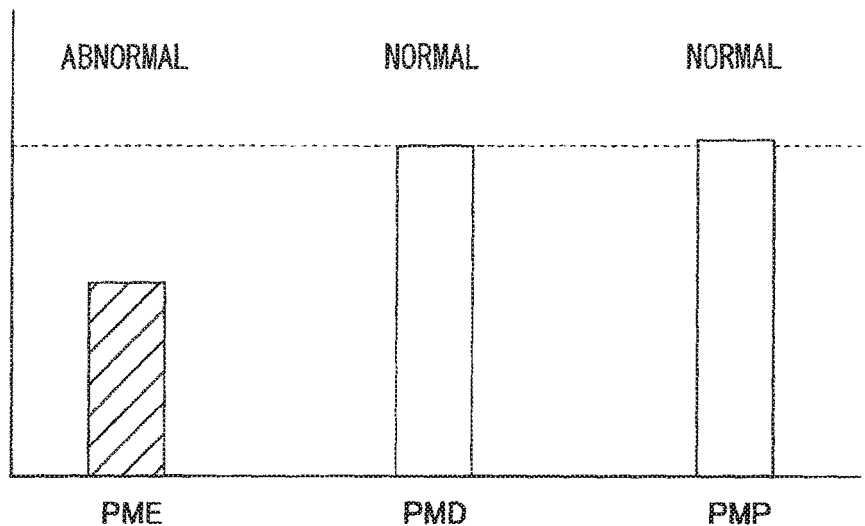
FIG. 12 is a view showing a relation among respective amounts of PM in a case of an abnormality of the engine.

After the respective estimated amounts of PM, PME, PMD, and PMP, are calculated in the manner as above, the first PM amount PME, the second PM amount PMD, and the third PM amount PMP are compared with one another, When a result turns out to be a case as is shown in FIG. 12 where the second PM amount PMD and the third PM amount PMP coincide with each other and the first PM amount PME is smaller than the second PM amount PMD and the third PM amount PMP, an abnormal of the engine 11 is determined.

That is to say, in a case where the second PM amount PMD and the third PM amount PMP coincide with each other, it can be determined that the partially-plugged filter 31 and the PM sensor 32 are normal. In a case where the first PM amount PME is smaller than the coinciding estimated amounts of PM, PMD and PMP, a determination is made that it is a state in which an amount of PM emitted from the engine 11 is too large due to an abnormality of the engine 11. Hence, an abnormality of the engine 11 (a state in which an amount of PM generation is extraordinary large) can be determined.

Figure 13:
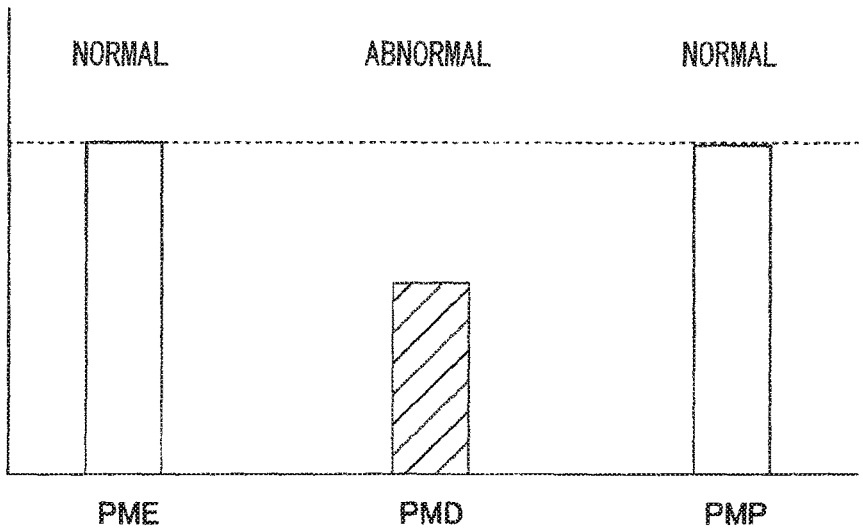
FIG. 13 is a view showing a relation among respective amounts of PM in a case of an abnormality of the filter.

In a case as is shown in FIG. 13 where the first PM amount PME and the third PM amount PMP coincide with each other and the second PM amount PMD is smaller than the first PM amount PME and the third PM amount PMP, an abnormality of the partially-plugged filter 31 is determined.

That is to say, in a case where the first PM amount PME and the third PM amount PMP coincide with each other, it can be determined that the engine 11 and the PM sensor 32 are normal. In a case where the second PM amount PMD is smaller than the coinciding estimated amounts of PM, PME and PMP, a determination is made that it is a state in which an amount of deposited PM of the partially-plugged filter 31 is too small. Hence, an abnormality of the partially-plugged filter 31 (a state in which a PM capturing rate is extraordinary low) can be determined.

Figure 14:
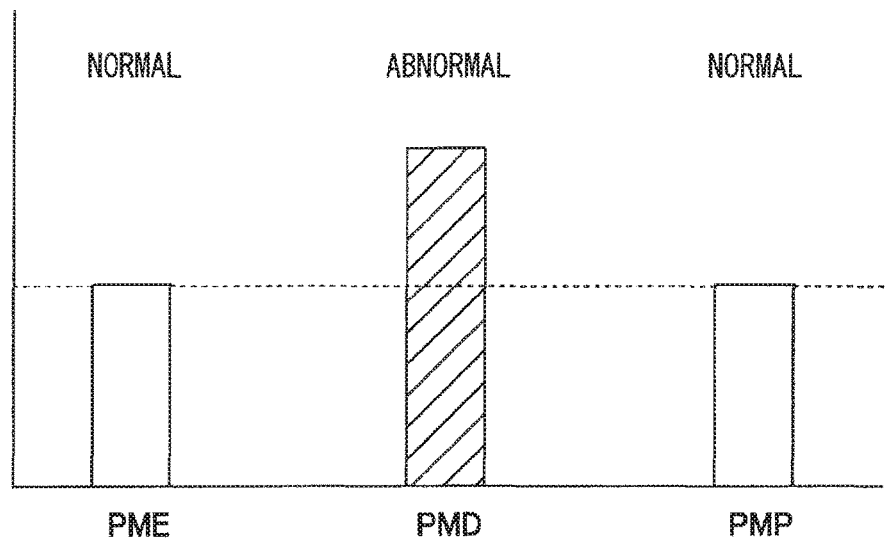
FIG. 14 is a view showing a relation among respective amounts of PM in a case of a recycle abnormality of the filter.

In a case as is shown in FIG. 14 where the first PM amount PME and the third PM amount PMP coincide with each other and the second PM amount PMD is larger than the first PM amount PME and the third PM amount PMP, a recycle abnormality of the partially-plugged filter 31 is determined.

That is to say, in a case where the first PM amount PME and the third PM amount PMP coincide with each other, it can be determined that the engine 11 and the PM sensor 32 are normal. In a case where the second PM amount PMD is larger than the coinciding estimated amounts of PM, PME and PMP, a determination is made that it is a state in which an amount of deposited PM of the partially-plugged filter 31 is too large. Hence, a recycle abnormality of the partially-plugged filter 31 (a state in which PM is not removed properly by the recycle control) can be determined.

Figure 15:
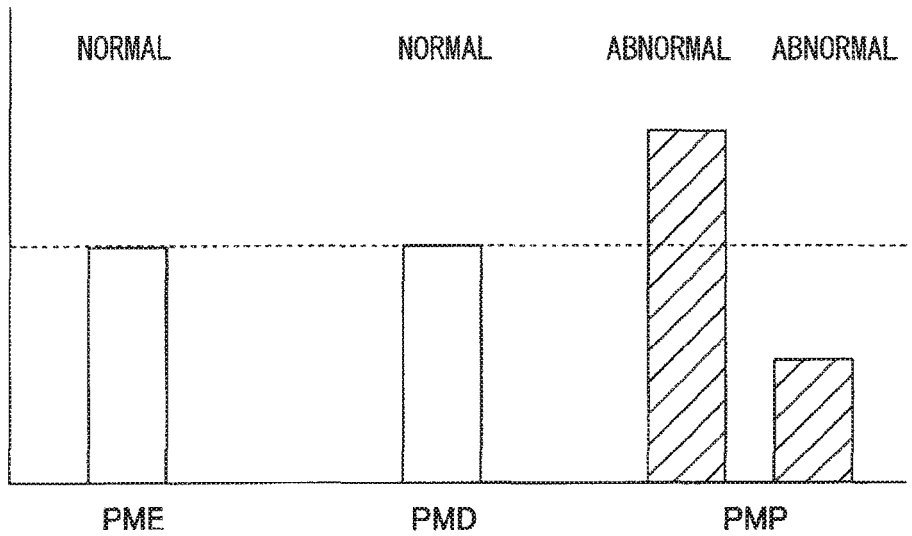
FIG. 15 is a view showing a relation of respective estimated amounts of PM in a case of an abnormality of the PM sensor.

In a case as is shown in FIG. 15 where the first PM amount PME and the second PM amount PMD coincide with each other and the third PM amount PMP is different from the first PM amount PME and the second PM amount PMD, an abnormality of the PM sensor 32 is determined.

That is to say, in a case where the first PM amount PME and the second PM amount PMD coincide with each other, it can be determined that the engine 11 and the partially-plugged filter 31 are normal. In a case where the third PM amount PMP is different from the coinciding estimated amounts of PM, PME and PMD, a determination is made that it is a state in which the PM sensor 32 is not functioning properly. Hence, an abnormality of the PM sensor 32 can be determined.

The abnormality diagnosis of the present embodiment described above is performed by the ECU 30 in accordance with the abnormality diagnosis routine depicted in FIG. 16 and FIG. 17. The following will describe a content of processes of the routine.

The abnormality diagnosis routine depicted in FIG. 16 and FIG. 17 is performed repetitively in predetermined cycles while a power supply of the ECU 30 is turned on and serves as an abnormality diagnosis portion.

When the routine is started, an engine running condition (an engine speed, an engine load, a coolant temperature, an operation history, and so on) is obtained in 101. Subsequently, advancement is made to 102, in which an output of the pressure difference sensor 36 is obtained. Subsequently, advancement is made to 103, in which an output of the PM sensor 32 is obtained.

Subsequently, advancement is made to 104, in which the first PM amount PME is calculated. More specifically, an amount of engine-emitted PM is calculated according to an engine speed, an engine load (for example, an intake pipe pressure or an amount of intake air), a coolant temperature, an operation history, and so on with reference to a map or in accordance with a mathematical formula. An amount of engine-emitted PM thus calculated is given as a filter inflow PM amount PME.

a filter inflow PM amount PME=an amount of engine-emitted PM

A filter inflow PM amount PME estimated (calculated) according to a running condition of the engine 11 in the manner as above is given as the first PM amount PME. A process in 104 serves as a first estimation portion.

Subsequently, advancement is made to 105, in which the second PM amount PMD is calculated. More specifically, an amount of captured PM of the partially-plugged filter 31 is calculated according to an output of the pressure difference sensor 36 and a filter inflow PM amount PMD is calculated in accordance with an equation below by using a calculated amount of captured PM and a PM capturing rate.

a filter inflow PM amount PMD=an amount of captured PM/PM capturing rate

A filter inflow PM amount PMD estimated (calculated) according to an output of the pressure difference sensor 36 in the manner as above is given as the second PM amount PMD. A process in 105 serves as a second estimation portion.

Subsequently, advancement is made to 106, in which the third PM amount PMP is calculated. More specifically, an amount of sensor-detected PM is calculated according to an output of the PM sensor 32 and a filter inflow PM amount PMP is calculated in accordance with an equation below by using a calculated amount of sensor-detected PM and a PM capturing rate.

a filter inflow PM amount PMP=an amount of sensor-detected PM/(1−PM capturing rate)

A filter inflow PM amount PMP estimated (calculated) according to an output of the PM sensor 32 in the manner as above is given as the third PM amount PMP. A process in 106 serves as a third estimation portion.

After the respective estimated amounts of PM, PME, PMD, and PMP, are calculated in the manner described above, advancement is made to 107 of FIG. 17, in which a determination is made as to whether an absolute value of a difference between the first PM amount PME and the second PM amount PMD, |PME−PMD|, is equal to or less than a predetermined margin K1. The margin K1 is a value set in consideration of an estimation variation in (estimation error of) the estimated amount of PM, PME, and an estimation variation in the estimated amount of PM, PMD. For example, the margin K1 is set to a maximum value of an estimation variation in the estimated amount of PM, PME, and an estimation variation in the estimated amount of PM, PMD, or a sum of an estimation variation in the estimated amount of PM, PME, and an estimation variation in the estimated amount of PM, PMD.

In a case where it is determined in 107 that an absolute value of the difference, |PME−PMD|, is equal to or less than the margin K1, it is determined that the first PM amount PME and the second PM amount PMD coincide with each other. In such a case, advancement is made to 108, in which a determination is made as to whether an absolute value of a difference between the first PM amount PME and the third PM amount PMP, |PME−PMP|, is equal to or less than a predetermined margin K2. The margin K2 is a value set in consideration of an estimation variation in the estimated amount of PM, PME, and an estimation variation in the estimated amount of PM, PMP. For example, the margin K2 is set to a maximum value of an estimation variation in the estimated amount of PM, PME, and an estimation variation in the estimated amount of PM, PMP, or a sum of an estimation variation in the estimated amount of PM, PME, and an estimation variation in the estimated amount of PM, PMP.

In a case where it is determined in 108 that an absolute value of the difference, |PME−PMP|, is equal to or less than the margin K2, it is determined that the first PM amount PME and the third PM amount PMP coincide with each other. In such a case, advancement is made to 113, in which all of the engine 11, the partially-plugged filter 31, and the PM sensor 32 are normal.

On the contrary, in a case where it is determined in 108 that an absolute value of the difference, |PME−PMP|, is larger than the margin K2, it is determined that the third PM amount PMP is different from the first PM amount PME and the second PM amount PMD. In such a case, advancement is made to 114, in which a determination is made that the PM sensor 32 is not functioning properly. Hence, an abnormality of the PM sensor 32 is determined.

Meanwhile, in a case where it is determined in 107 that an absolute value of the difference, |PME−PMD|, is larger than the margin K1, it is determined that the first PM amount PME and the second PM amount PMD do not coincide with each other. In such a case, advancement is made to 109, in which a determination is made as to whether an absolute value of a difference between the first PM amount PME and the third PM amount PMP, |PME−PMP|, is equal to or less than the margin K2.

When it is determined in 109 that an absolute value of the difference, |PME−PMP|, is equal to or less than the margin K2, it is determined that the first PM amount PME and the third PM amount PMP coincide with each other. In such a case, advancement is made to 110, in which a determination is made as to whether a difference between the first PM amount PME and the second PM amount PMD, (PME−PMD), is larger than the margin K1.

In a case where it is determined in 110 that the difference (PME−PMD) is larger than the margin K1, it is determined that the second PM amount PMD is smaller than the other estimated amounts of PM, PME and PMP. In such a case, advancement is made to 115, in which a determination is made that it is a state in which an amount of deposited PM of the partially-plugged filter 31 is too small. Hence, an abnormality of the partially-plugged filter 31 (a state in which a PM capturing rate is extraordinary low) is determined.

On the contrary, in a case where it is determined in 110 that the difference (PME–PMD) is equal or less than the margin K1, it is determined that the second PM amount PMD is larger than the other estimated amounts of PM, PME and PMP. In such a case, advancement is made to 116, in which a determination is made that it is a state in which an amount of deposited PM of the partially-plugged filter 31 is too large. Hence, a recycle abnormality of the partially-plugged filter 31 (a state in which PM is not removed properly by the recycle control) is determined.

Meanwhile, in a case where it is determined in 109 that an absolute value of the difference, |PME–PMP|, is larger than the margin K2, it is determined that the first PM amount PME and the third PM amount PMP do not coincide with each other. In such a case, advancement is made to 111, in which a determination is made as to whether an absolute value of a difference between the second PM amount PMD and the third PM amount PMP, |PMD–PMP|, is equal to or less than a predetermined margin K3. The margin K3 is a value set in consideration of an estimation variation in the estimated amount of PM, PMD, and an estimation variation in the estimated amount of PM, PMP. For example, the margin K3 is set to a maximum value of an estimation variation in the estimated amount of PM, PMD, and an estimation variation in the estimated amount of PM, PMP, or a sum of an estimation variation in the estimated amount of PM, PMD, and an estimation variation in the estimated amount of PM, PMP.

When it is determined in 111 that an absolute value of the difference, |PMD–PMP|, is equal to or less than the margin K3, it is determined that the second PM amount PMD and the third PM amount PMP coincide with each other. In such a case, advancement is made to 112, in which a determination is made as to whether a difference between the second PM amount PMD and the first PM amount PME, (PMD–PME), is larger than the margin K1.

When it is determined in 112 that the difference (PMD–PME) is larger than the margin K1, it is determined that the first PM amount PME is smaller than the other estimated amounts of PM, PMD and PMP, In such a case, advancement is made to 117, in which a determination is made that it is a state in which an amount of PM emitted from the engine 11 is too large due to an abnormality of the engine 11. Hence, an abnormality of the engine 11 (a state in which an amount of PM generation is extraordinary large) is determined.

In the present embodiment described above, a filter inflow PM amount PME is estimated according to a running condition of the engine 11 and the filter inflow PM amount PME thus estimated is given as the first PM amount PME. Also, a filter inflow PM amount PMD is estimated according to an output of the pressure difference sensor 36 and the filter inflow PM amount PMD thus estimated is given as the second PM amount PMD, Further, a filter inflow PM amount PMP is estimated according to an output of the PM sensor 32 and the filter inflow PM amount PMP thus estimated is given as the third PM amount PMP. Finally, an abnormality of the engine 11, an abnormality of the partially-plugged filter 31, and an abnormality of the PM sensor 32 are determined distinctly by comparing the first PM amount PME, the second PM amount PMD, and the third PM amount PMP with one another.

When all of the engine 11, the partially-plugged filter 31, and the PM sensor 32 are normal, the first PM amount PME, the second PM amount PMD, and the third PM amount PMP are expected to substantially coincide with one another. However, in the event of an abnormality in any one of the engine 11, the partially-plugged filter 31, and the PM sensor 32, an estimated amount of PM in a location of abnormality becomes different from the other estimated amounts of PM. Hence, by comparing the first PM amount PME, the second PM amount PMD, and the third PM amount PMP, an abnormality of the engine 11, an abnormality of the partially-plugged filter 31, and an abnormality of the PM sensor 32 can be determined distinctly. Consequently, a location of abnormality can be pinpointed when an abnormality occurs in any one of the engine 11, the partially-plugged filter 31, and the PM sensor 32.

In the present embodiment, margins are set in consideration of estimation variations (estimation errors) in the respective estimated amounts of PM when the respective estimated amounts of PM are compared, Hence, even when the respective estimated amounts of PM include an estimation variation, the respective estimated amounts of PM can be compared with one another appropriately. Consequently, an erroneous determination caused by an estimation variation can be prevented.

In the embodiment above, an amount of filter inflow PM is estimated as a diagnosis amount of PM. However, the present disclosure is not limited to the configuration as above. An amount of filter-captured PM or an amount of filter outflow PM may be estimated by three estimation methods as a diagnosis amount of PM to distinctly determine an abnormality of the engine 11, an abnormality of the partially-plugged filter 31, and an abnormality of the PM sensor 32 by comparing the respective estimated amounts of PM.

In the embodiment above, the present disclosure is applied to a system provided with a partially-plugged filter having a structure in which some cells are closed on an inlet side and all cells are opened on an outlet side. However, an application of the present disclosure is not limited to the system as above. The present disclosure may also be applied to a system provided with a partially-plugged filter having a structure in which some cells are closed on an outlet side and all cells are opened on an inlet side.

In the embodiment above, the present disclosure is applied to a system provided with a partially-plugged filter having a structure in which some cells are closed on an inlet side and all cells are opened on an outlet side. However, an application of the present disclosure is not limited to the system as above. The present disclosure may be applied to a system provided with a partially-closed filter having a structure in which some cells are closed on an inlet side and some of the other cells (inlet-opened cells) are closed on an outlet side. Alternatively, the present disclosure may be applied to a system provided with a partially-plugged filter having a structure in which some cells are closed on an outlet side and all cells are opened on an inlet side, or a partially-plugged filter having a structure in which some cells are closed on an outlet side and some of the other cells (outlet-opened cells) are closed on an inlet side. In short, the present disclosure can be applied to any system provided with a partially-plugged filter having a structure in which some cells are opened on both of an inlet side and an outlet side.

In the embodiment above, the present disclosure is applied to a system equipped with an in-cylinder injection gasoline engine. However, an application of the present disclosure is not limited to the system as above. The present disclosure can be applied to any system provided with a partially-plugged filter even when the system is equipped with a diesel engine or an intake-port injection gasoline engine.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An abnormality diagnosis device, comprising:
a partially-plugged filter capturing particulate matter in an exhaust gas from an internal combustion engine, the partially-plugged filter having a plurality of cells, and the partially-plugged filter having a structure in which some of the cells are closed on an inlet side and at least one of the other cells is opened on an outlet side or a structure in which some of the cells are closed on the outlet side and at least one of the other cells is opened on the inlet side;
a pressure difference sensor detecting a difference between an exhaust pressure on an upstream side of the partially-plugged filter and an exhaust pressure on a downstream side of the partially-plugged filter;
a PM sensor detecting an amount of PM in an exhaust gas which has passed through the partially-plugged filter and an electronic control unit (ECU) programmed to execute control of the abnormality diagnosis device, the ECU comprising:
a first estimation portion estimating a diagnosis amount of PM, which is one of an amount of PM flowing into the partially-plugged filter, an amount of PM captured in the partially-plugged filter, and an amount of PM flowing out from the partially-plugged filter according to a running condition of the internal combustion engine;
a second estimation portion estimating the diagnosis amount of PM according to an output of the pressure difference sensor;
a third estimation portion estimating the diagnosis amount of PM according to an output of the PM sensor; and
an abnormality diagnosis portion distinctly determining an abnormality of the internal combustion engine, an abnormality of the partially-plugged filter, and an abnormality of the PM sensor by comparing a first PM amount that is the diagnosis amount of PM estimated by the first estimation portion, a second PM amount that is the diagnosis amount of PM estimated by the second estimation portion, and a third PM amount that is the diagnosis amount of PM estimated by the third estimation portion.

2. The abnormality diagnosis device according to claim 1, wherein
the abnormality diagnosis portion determines an abnormality of the internal combustion engine in a case where the second PM amount and the third PM amount coincide with each other and the first PM amount is smaller than the second PM amount and the third PM amount.

3. The abnormality diagnosis device according to claim 1, wherein
the abnormality diagnosis portion determines an abnormality of the partially-plugged filter in a case where the first PM amount and the third PM amount coincide with each other and the second PM amount is smaller than the first PM amount and the third PM amount.

4. The abnormality diagnosis device according to claim 1, wherein
the abnormality diagnosis portion determines a recycle abnormality of the partially-plugged filter in a case where the first PM amount and the third PM amount coincide with each other and the second PM amount is larger than the first PM amount and the third PM amount.

5. The abnormality diagnosis device according to claim 1, wherein
the abnormality diagnosis portion determines an abnormality of the PM sensor in a case where the first PM amount and the second PM amount coincide with each other and the third PM amount is different from the first PM amount and the second PM amount.

6. The abnormality diagnosis device according to claim 1, wherein
the abnormality diagnosis portion sets a margin in consideration of an estimation variation in each of estimated amounts of PM given as the first to third PM amounts when comparing the first to third PM amounts with one another.

* * * * *